Oct. 5, 1937.  L. P. SHARPLES  2,095,206
MACHINE AND METHOD FOR SEPARATING SOLIDS FROM LIQUIDS
Filed May 31, 1934  4 Sheets-Sheet 1

INVENTOR.
LAURENCE P. SHARPLES.
BY Maurice A. Crews
ATTORNEY.

Oct. 5, 1937.   L. P. SHARPLES   2,095,206
MACHINE AND METHOD FOR SEPARATING SOLIDS FROM LIQUIDS
Filed May 31, 1934   4 Sheets-Sheet 2

INVENTOR.
LAURENCE P. SHARPLES.
BY Maurice A. Crews
ATTORNEY.

Oct. 5, 1937. L. P. SHARPLES 2,095,206
MACHINE AND METHOD FOR SEPARATING SOLIDS FROM LIQUIDS
Filed May 31, 1934 4 Sheets-Sheet 3

INVENTOR.
LAURENCE P. SHARPLES
BY Maurice A. Crews
ATTORNEY.

Oct. 5, 1937.  L. P. SHARPLES  2,095,206
MACHINE AND METHOD FOR SEPARATING SOLIDS FROM LIQUIDS
Filed May 31, 1934  4 Sheets-Sheet 4
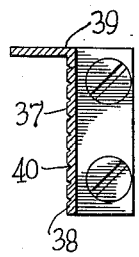
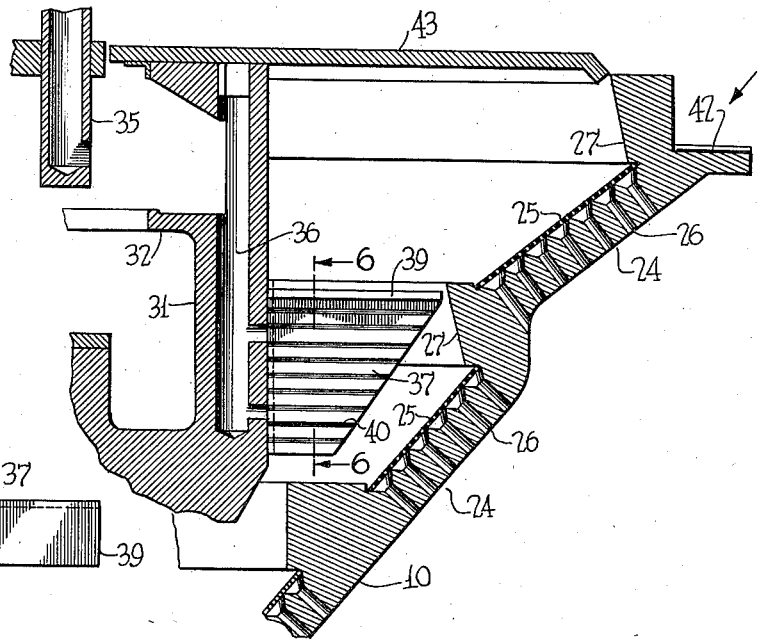
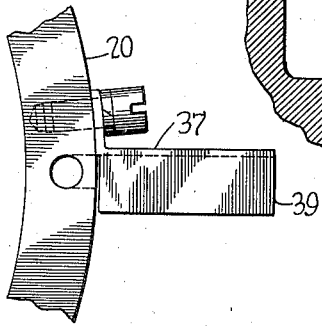
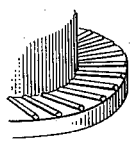
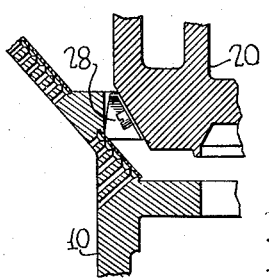
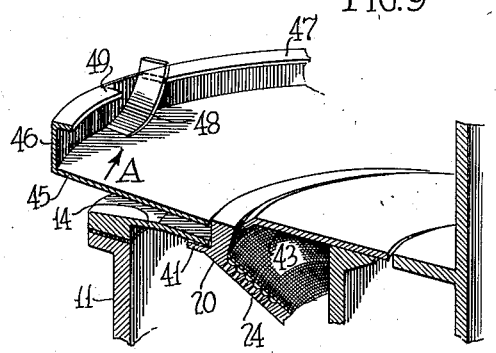
*INVENTOR.*
LAURENCE P. SHARPLES
BY Maurice A. Crews
*ATTORNEY.*

Patented Oct. 5, 1937

2,095,206

UNITED STATES PATENT OFFICE 2,095,206

MACHINE AND METHOD FOR SEPARATING SOLIDS FROM LIQUIDS

Laurence Price Sharples, Haverford, Pa., assignor to The Sharples Specialty Company, Philadelphia, Pa., a corporation of Delaware Application May 31, 1934, Serial No. 728,269

12 Claims. (Cl. 210—69)

The present invention pertains to the separation of liquid from solids and more particularly to the seperation of small solid particles in substantially dry condition from liquid in which such solids are suspended, or liquid adhering to such solids. An example of a separating operation of this character is the separation of mother liquor from crystals formed by the cooling of such liquor.

The primary object of the invention has been to effect, on a commercial scale, a more adequate and rapid dehydration of such solids than has been possible in the use of machines and practice of processes of the prior art.

In the co-pending application of Nathaniel Brewer, Serial No. 631,180, filed August 31, 1932, there are described a machine and process for effecting a continuous centrifugal dehydrating operation in which the dehydrating operation is performed in a succession of stages in which each stage involves flow of the material under treatment radially outwardly and longitudinally of the centrifugal rotor along a straining surface under the influence of centrifugal force and longitudinal flow over a retarding surface arranged adjacent such straining surface, the flow along the retarding surface being attained by positive feed of the material under treatment by means of a series of circumferentially and longitudinally spaced plows. In the preferred form of that invention the straining surfaces extend conically outwardly from the axis of the rotor and the retarding surfaces conically inwardly toward said axis.

The present invention is similar to that of the Brewer application in these general features, but includes a number of improvements by which difficulties encountered in the practice of the process and use of the machine of the Brewer application are obviated. Thus, the present invention includes improvements whereby solids are dehydrated and washed in a series of operations involving initial dehydration, followed by application of wash water to the partially dehydrated material and in turn followed by an additional dehydrating step in which wash water and residual liquid may be removed from the solids. It also includes features of machine design resulting in avoidance of impairment of efficiency of operation because of cloggage of screen surfaces. Further features of the invention pertain to the provision of additional precautions for avoiding the discharge of liquid from the rotor together with solids, of means for deflecting discharged solids in a substantially vertical direction in such a manner as to enable them to be additionally dried during their ascent and descent, the provision of a special sealing arrangement which avoids contamination by liquid discharged from the rotor of solids separately discharged therefrom and the performance, within the centrifugal rotor, of a sequence of rinsing operations best adapted to the removal of impurities from solids under treatment and to the effective dehydration of such solids.

Further objects and features of the invention will be obvious from a reading of the following detailed description in the light of the attached drawings, in which, Figure 1 is a plan view of a machine embodying the principles of the invention with parts cut away to illustrate the interior construction.

Fig. 5 is a cross section on the line 5—5 of Fig. 1.

Fig. 6 is a cross section on the line 6—6 of Fig. 5, illustrating a detail of the arrangement for rinsing solids passing through the rotor.

Fig. 7 is a plan view illustrating a detail of the rinse water feed arrangement.

Fig. 8 is a detailed cross section illustrating the means for removing solids from the retarding section of the first separating stage of the rotor.

Fig. 9 is a detailed cross section illustrating the arrangement for deflecting solids upwardly after their discharge from the rotor, and Fig. 10 is a detailed perspective view looking in the direction of the arrow A in Fig. 5.

Figure 1:
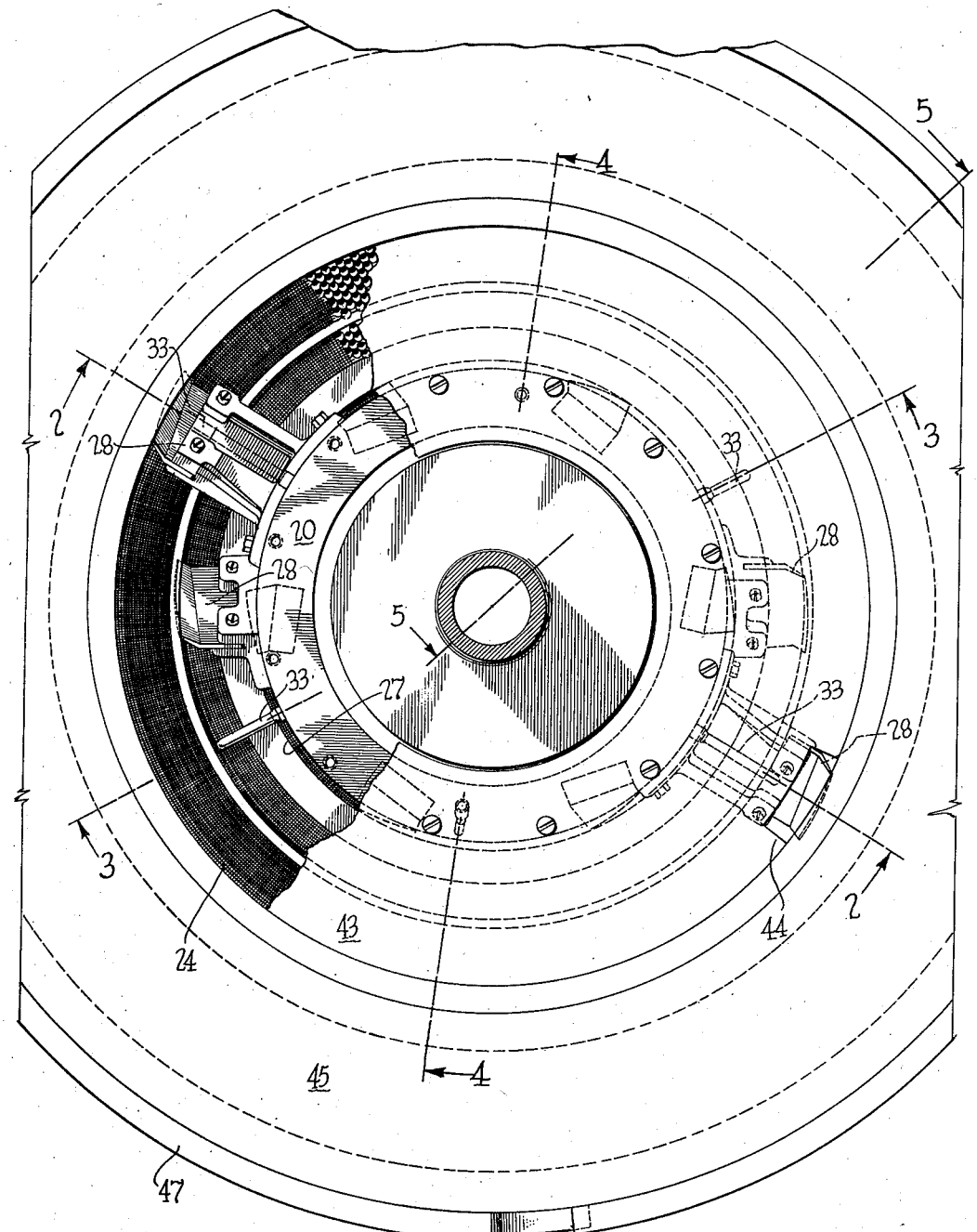

Referring to the drawings by reference characters, the numeral 10 indicates a centrifugal rotor and the numeral 11 a casing in which it is contained. This casing comprises a base portion 12 and a top portion 13 having a cover 14 mounted upon its upper open end which overlies a flange extending circumferentially outwardly from the main body of the rotor. The casing 11 is in turn contained within an outer casing 15 comprising a main body portion 16 and a cover portion 17 which overlies the entire upper end of the machine. The slurry, containing the solids which are to be dried within the rotor, is fed to the rotor from above by means of a feed funnel 18 having a lower end 19 communicating with the interior of a rotary feed head 20. This rotary feed head is secured to a shaft 21 which is constantly rotated during the feed of slurry to the machine. During such feed the slurry is continuously ejected through a plurality of circular feed openings 22 under the influence of centrifugal force and deposited against the lower end of the separating chamber of the rotor 10. The rotor 10 is mounted upon a shaft 23 which is rotated at a velocity slightly different from that of the feed head 20. The machine of the present invention is not substantially different from that of the machine described in the aforementioned Brewer application in connection with the above described details.

The separation of liquid from solid material fed to the rotor is accomplished, in the preferred form of the invention, in a plurality of separating stages, each of such stages involving a straining zone 24 incorporating a strainer 25 and a pervious backing surface 26 and a retarding zone 27 adapted to prevent too rapid flow of material across the straining zone and thereby to insure a sufficiently protracted drying operation to effect adequate dehydration of the solids under treatment. The successive straining zones flare conically outwardly from the zone of feed to the rotor toward the zone of discharge therefrom, the conical flare of the successive straining sections being greater than the natural angle of repose of the solids under treatment in order that these solids may be impelled longitudinally of the successive straining zones under the action of centrifugal force without the application of any other impelling force thereto. The successive retarding sections are also preferably of frustro-conical shape and have a conicity which is the reverse of that of the strainer sections. Solids entering the bowl are thus subjected to an impelling action longitudinally and upwardly of the bowl along the lowermost strainer section by reason of the application of centrifugal force thereto. Continued feed of solids to this section of the rotor has the effect, however, of causing an accumulation of solids upon the first retarding section 27 and a consequent retardation of solids subsequently fed to the lowermost strainer section 24. Such retardation would result, if allowed to persist, in the accumulation of a layer of solids on the lowermost strainer section of such thickness as to impair the efficiency of separation by reason of the difficulty of egress of water through the thick bed of solids, and mechanical means are accordingly provided for continuously scraping accumulated solids from the successive retarding sections in order to retain within the rotor during its continuous operation beds or cakes of solids of substantially uniform thickness. To this end circumferentially spaced plows 28 are secured to the portions of the feed head lying adjacent the respective retarding sections in order to sweep solids continuously upwardly along these retarding sections. These plows are of very limited radial extent, it being unnecessary to utilize impelling means having a continuous impelling action upon the entire mass of material on the retarding surfaces in cases in which these retarding surfaces are correctly designed with a conicity less than the angle of repose of the solids under treatment.

In the particular machine illustrated in the drawings, three successive separating zones are shown. In the operation of this machine upon solids continuously fed to the rotor, a preliminary separation of liquid from solids occurs in the lowermost strainer section 24 and the solid material deposited in this section is continuously impelled through the lowermost retarding section 27 to the second strainer section where a repetition of the successive straining and retarding steps takes place to effect removal of further liquid from the solids. At the completion of the third and final drying operation of the rotor in the uppermost section, the substantially completely dried solids are discharged in a substantially tangential direction from the upper edge 29 of the rotor, these discharged solids being directed against deflecting apparatus to be described hereinafter.

In the use of machines incorporating the general principles described above, a number of difficulties have been encountered. One of the most serious of these difficulties has been the tendency of the pervious rotor walls and screens to become clogged with fine solids. When such cloggage occurs, effective drying of the material under treatment is impaired, and it is accordingly desirable that such cloggage be prevented insofar as possible. In order to prevent such cloggage, the screen surfaces are progressively subjected to a rinsing action by the application of rinse liquid thereto in zones of limited circumferential extent directly rearwardly of the progressive ejecting action of the plows. Thus, rinse liquid is supplied to the feed head 20 by means of a conduit 30 extending through the cover 17 of the machine, this rinse liquid being confined within a well 31 of the feed head whose upper extremity is defined by an overlying flange 32. The rinse liquid flows from this well through nozzles 33 and against the screens 25 under the influence of centrifugal force, thereby rinsing these screens.

Figure 3:
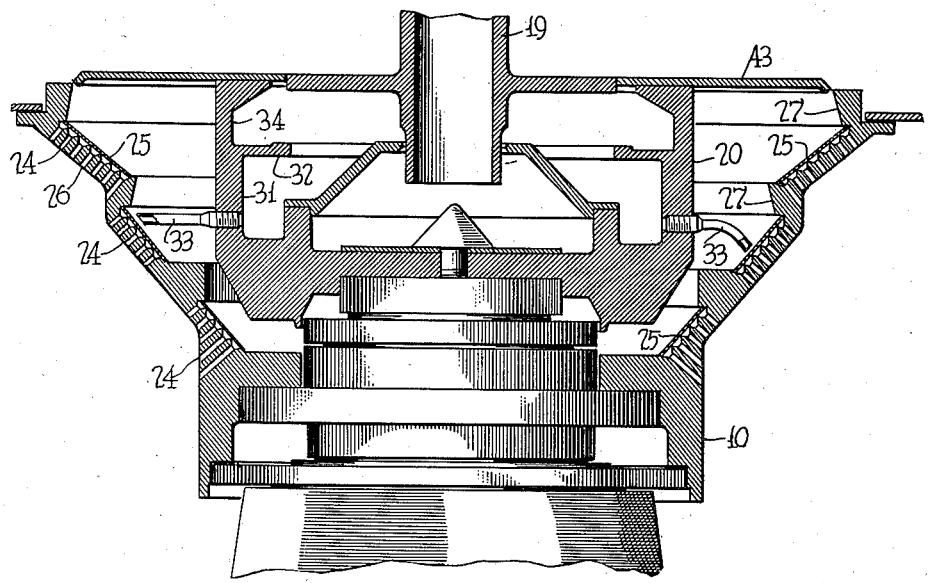
Fig. 3 is a cross section on the line 3—3 of Fig. 1.
Figure 4:
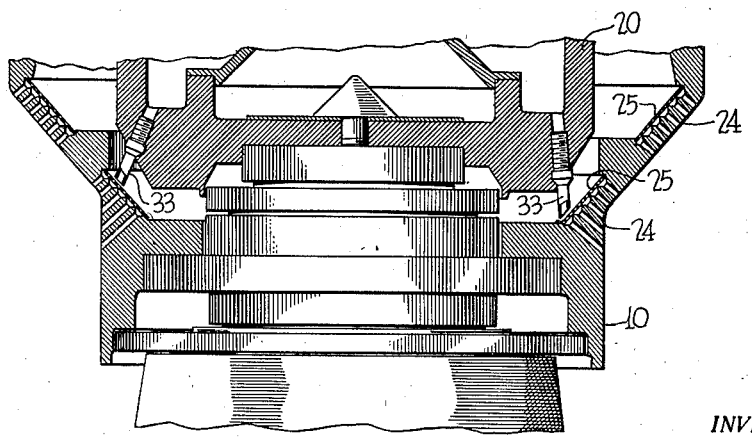
Fig. 4 is a cross section similar to Fig. 3 but taken on a slightly different angle and on the line 4—4 of Fig. 1 illustrating only the construction of the lower part of the rotor.

The relative circumferential location of the nozzles 33 forms an important feature of the invention. Figure 1 illustrates this relative location with respect to the nozzles by which rinse liquid is applied to the uppermost screen. It will be seen by reference to that figure that the nozzles 33 are located directly rearwardly of the plows 28 by means of which solids are fed upwardly along the retarding surfaces associated with the screens to which rinse liquid is applied. It will thus be seen that the relative action of the plows and rinse nozzles is such as to effect coordinated rotation of these members to apply rinse liquid to a particular portion of the screen surface directly after solids have been removed therefrom. Thus, as the plow 29 ejects solids from a particular circumferential zone of the screen surface, solids lying on the screen surface in the same circumferential zone but beneath the removed solids are impelled upwardly under the influence of centrifugal force and the nozzles 33 immediately apply rinse liquid to the zone vacated by these last mentioned solids while the screen is substantially free of solids. It will be seen that rewetting of partially dried solids is largely avoided by this arrangement and that any such rewetting which may occur is largely offset by reason of the fact that the solids which may be rewet are subjected to a maximum degree of centrifugal drying action before being ejected by the plows. Although the particular relative location of the plows and nozzles associated with the lower screens is not illustrated in Figures 3 and 4, it will be understood that their relationship is the same as that discussed above with respect to the uppermost drying stage.

In addition to the above described arrangement for progressively rinsing the screen surfaces, means are provided for applying rinse liquid to the mass of deposited solids in one or more of the straining zones. Such means may comprise a well 34 whose lower end is defined by the flange 32 constituting the upper end of the well 31 and this well may receive liquid through a conduit 35 and expel it into a conduit 36 from which it is adapted to be dispersed over the deposited bed of solids in one of the lower straining and retarding stages by means of a spreader member 37 from which the liquid flows in an axially extending thin stream into contact with the bed of solids. The spreader 37 is illustrated in Figures 5-7 and comprises a plate 38 secured to the feed head and extending radially and axially of the bowl, the plate being provided with a confining flange 39 upon its upper end and with a plurality of radially extending grooves 40 intermediate its extremities. These grooves 40 serve to limit the flow of liquid longitudinally of the spreader plate and the rotation of the plate causes the liquid to spread radially outwardly in a thin stream and overflow the outer edge of the plate, thereby progressively rinsing the body of solids surrounding this outer edge during the relative rotation of the feed head 20 and rotor 10.

It will be noted that provision is made for the rinsing of the screen surfaces at each of the separating stages whereas the cake is rinsed only at one of the lower stages, the cake rinse being shown as applied only to the second stage in the drawings. The reason for this arrangement lies in the fact that it is undesirable to add cake rinse liquid against the main body of solids in the last separating stage because of the difficulty of removing this liquid prior to discharge of the solids from the rotor. In connection with these rinse arrangements, it is desirable that the cake rinse liquid applied by the spreader 37 be a relatively poor solvent for the solids and the screen rinse liquid be a better solvent.

In the performance of a drying operation of the character of that performed by the present machine, it is naturally important that contamination of discharged solids by discharged liquid be avoided and the invention includes novel means for the attainment of this result. This means constitutes a liquid seal formed by designing the cover 14 and an outwardly extending flange 41 on the upper end of the rotor in closely contiguous overlapping relationship for a substantial radial extent. The effect of this seal is to impel air outwardly through the narrow space between these overlapping members under the influence of centrifugal force from the rotating flange 41 and thereby to prevent ingress of water through this space. In the preferred embodiment of the invention, the flange 41 is provided with a plurality of wires or fins 42 constituting impeller blades which augment this sealing function.

In the preferred embodiment of the invention the feed head 20 is provided with an overhanging plate or flange 43 which may comprise a separate annular plate secured to the upper end of the feed head, as illustrated. The outer edge of this plate extends into close proximity to the edge 29 of the rotor and serves the dual function of restricting the rate of discharge of solids from the rotor and preventing liquid from splashing over the upper end of the rotor and contaminating discharged solids. This splash plate is provided with a restricted opening or cut-away portion in its periphery adjacent each of the uppermost plows 28 in order to permit solids to be ejected over the edge 29 by the plows.

Figure 2:
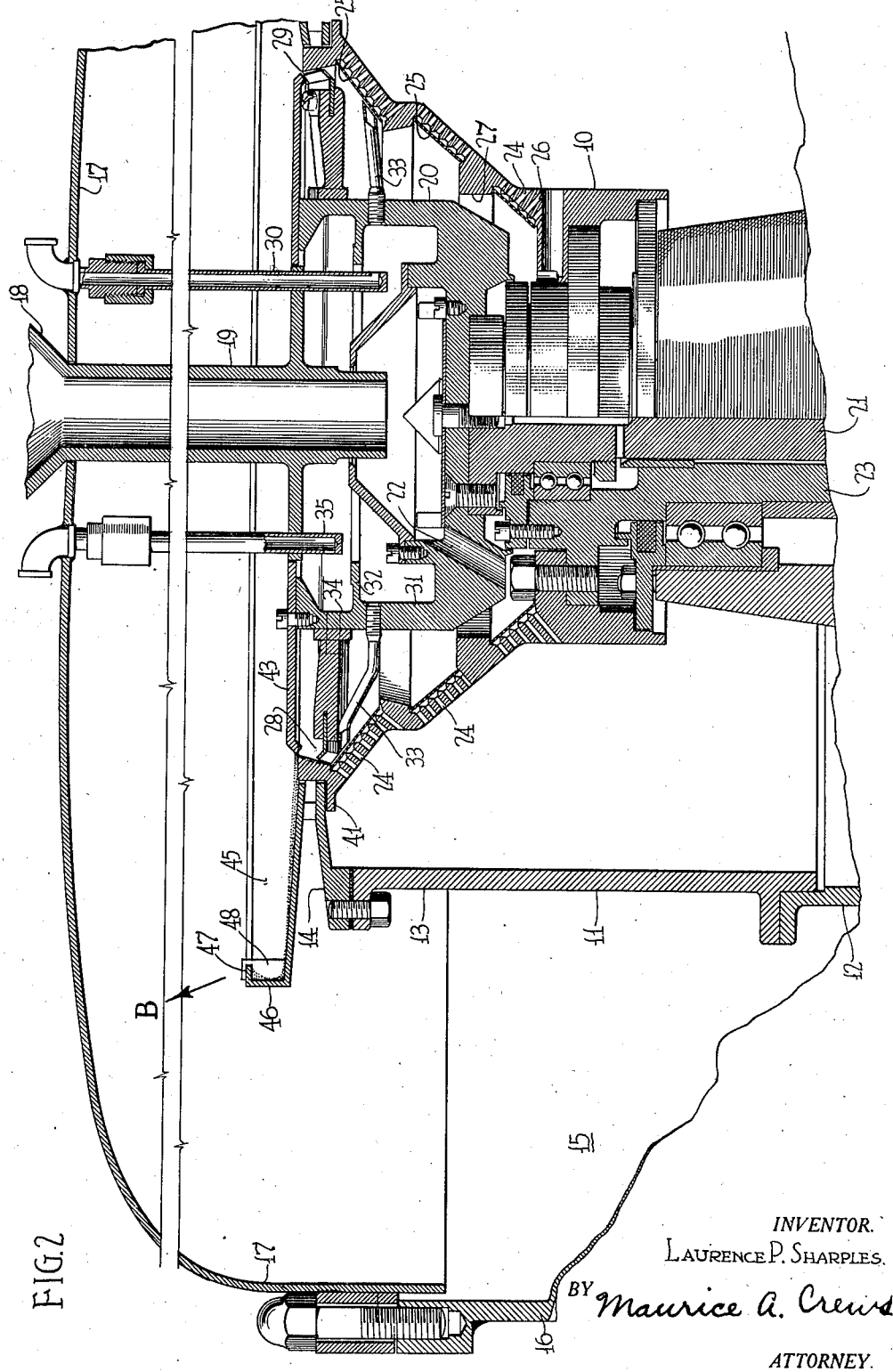
Fig. 2 is a cross section on the line 2—2 of Fig. 1.

The invention includes a novel arrangement of parts adjacent the discharge end of the rotor for avoiding adhesion of discharged solids to surfaces which they contact upon discharge and for effecting removal from such solids of any residual moisture which may adhere thereto. This arrangement includes a stationary annular trough 45 which surrounds the rotor adjacent its upper end and is provided with an upwardly extending flange 46 and with a reversely bent flange 47 extending radially inwardly from the flange 46. A plurality of tangentially arranged deflectors 48 are arranged adjacent the outer circumference of the trough 45 and serve to deflect upwardly from the trough solids which are discharged into the trough from the rotor. These deflectors 48 are arranged in cut-away portions 49 of the flange 47. It will be appreciated that solids discharged from the rotor are discharged substantially tangentially of the rotor and are therefore projected across the trough 45 in a direction forming a substantial angle with respect to the radius at which discharge from the rotor takes place, the general direction of discharge being indicated by the arrow A in Fig. 9. These solids will, therefore, be deflected along the inner circumference of the flange 46 of the trough and upwardly and outwardly therefrom as indicated by the arrow B in Fig. 2. The arrangement of the deflecting surfaces at a small angle with respect to the line of discharge prevents adhesion of discharged solids to the deflecting surfaces and the deflection of these solids upwardly in a vertical direction causes them to be suspended in the air within the casing for a substantial length of time before they are finally deposited, thereby affording an additional drying period in which residual moisture may be absorbed in the atmosphere of the casing.

From the above description it will be evident that the operation of the machine involves the feed of a slurry of liquid and solids through the feed funnel 18 to the feed head 20 and that this slurry is continuously fed through the rotating feed openings 22 into the lowermost separating stage of the rotor. The material is thereafter fed through the three separating stages during the removal of moisture therefrom and the application of rinse liquid in the intermediate separating stage. The screen surfaces are progressively rinsed as solids are removed therefrom by the plows 28 and the substantially completely dried solids are projected tangentially outwardly from the uppermost separating stage through discharge openings in the splash plate 43 and projected into the annular trough 45 from which they are discharged upwardly by the deflectors 47.

Modifications will be obvious to those skilled in the art and I do not therefore wish to be limited except by the scope of the sub-joined claims.

I claim:

1. In a machine for separating liquid from solids, the combination comprising a centrifugal rotor having a discharge outlet for solids and a straining surface through which liquid is adapted to be separately discharged during the movement of solids longitudinally of the rotor, means for directing a rinse liquid against the main body of solids during their movement through the rotor and means operative during the flow of solids through the rotor for progressively directing a wash liquid against portions of the straining surface from which the major portion of the solids have been removed.

2. In a machine for separating liquid from solids, the combination comprising a centrifugal rotor having a discharge outlet for solids and a plurality of longitudinally spaced straining surfaces through which liquid is adapted to be separately discharged during the movement of solids longitudinally of the rotor, means for applying rinse liquid to solids on a straining surface other than the straining surface in closest proximity to the zone of solid discharge and means for progressively applying a wash liquid to every one of said straining surfaces during the flow of solids through the rotor in zones of said straining surfaces which are substantially free of solids at the time of application of wash liquid thereto.

3. In a machine for continuously removing liquid from solids, the combination comprising a centrifugal rotor, means for feeding a slurry of liquid and solids to the rotor and means for supplying rinse liquid to the rotor, said last mentioned means comprising a plate having a face extending radially and axially of the rotor and having its outer edge lying within the rotor wall, means for rotating the plate about the rotor axis with said face extending forwardly in the direction of plate rotation and a source of rinse liquid communicating with the forward side of said plate.

4. In a machine for continuously removing liquid from solids, the combination comprising a centrifugal rotor, means for feeding a slurry of liquid and solids to the rotor and means for supplying rinse liquid to the rotor, said last mentioned means comprising a plate having a face provided with a plurality of radially extending shallow grooves extending radially and axially of the rotor and having its outer edge lying within the rotor wall, means for rotating the plate about the rotor axis with said face extending forwardly in the direction of plate rotation and a source of rinse liquid communicating with the forward side of said plate.

5. In a machine for separating liquid from solids, the combination comprising a centrifugal rotor having a discharge outlet for solids communicating with a zone of solid discharge and separate discharge outlets for liquid communicating with a zone of liquid discharge, means to effect separation and separate discharge of liquids and solids through said outlets into their respective discharge zones, a surface of substantial radial extent forming a part of said rotor and provided with a plurality of radially extending impeller ribs, and a stationary surface of substantial radial extent lying in proximity to and extending in substantially parallel overlapping relation with a portion of the aforesaid surface, said surfaces lying between said liquid and solid discharge zones, whereby to separate and form a seal between said zones of discharge and prevent contamination of discharged solids with discharged liquid.

6. In a machine for separating liquid from solids, the combination comprising a centrifugal rotor having a discharge outlet for solids communicating with a zone of solid discharge and separate discharge outlets for liquid communicating with a zone of liquid discharge, means to effect separation and separate discharge of liquids and solids through said outlets into their respective discharge zones, a fluid impeller lying between and interconnecting the zones of solid and liquid discharge, and means imparting to said impeller an impelling action toward the zone of liquid discharge, whereby to prevent contamination of discharged solids with discharged liquid.

7. In a machine for separating liquid from solids, the combination comprising a centrifugal rotor having a discharge outlet for solids communicating with a zone of solid discharge and separate discharge outlets for liquid communicating with a zone of liquid discharge, means to effect separation and separate discharge of liquids and solids through said outlets into their respective discharge zones, a centrifugal fluid impeller lying between and interconnecting the zones of solid and liquid discharge, and means imparting to said impeller an impelling action toward the zone of liquid discharge, whereby to prevent contamination of discharged solids with discharged liquid.

8. In a machine for separating liquid from solids, the combination comprising a centrifugal rotor including means to effect separation of liquids from solids, separate discharge outlets in said rotor for the separate discharge of liquids and solids therefrom, means for directing the discharge of liquids and solids from said rotor in substantially horizontal directions, and means for thereafter deflecting discharged solids upwardly in a substantially vertical direction.

9. In a machine for separating liquid from solids, the combination comprising a centrifugal rotor including means to effect separation of liquid from solids, separate discharge outlets in said rotor for the separate discharge of liquid and solids therefrom, means for directing the discharge of solids from said rotor in a substantially horizontal direction, and means for thereafter deflecting discharged solids upwardly in a direction forming a substantial angle with respect to the horizontal.

10. In a machine for separating liquid from solids, the combination comprising a centrifugal rotor including means to effect separation of liquid from solids, separate discharge outlets in said rotor for the separate discharge of liquids and solids therefrom, means for directing the discharge of solids from said rotor in generally horizontal directions, and deflecting means having leading edges arranged substantially in the plane of such discharge for thereafter deflecting discharged solids upwardly.

11. In a machine for separating liquid from solids, the combination comprising a centrifugal rotor including means to effect separation of liquid from solids, separate discharge outlets in said rotor for the separate discharge of liquid and solids therefrom, means for directing the discharge of solids from said rotor in a substantially horizontal direction, and means for thereafter deflecting discharged solids upwardly in a substantially vertical direction.

12. A method of separating and separately discharging liquid and solids contaminated with said liquid which comprises, passing said liquid and solids through a centrifugal rotor and separately discharging said liquid and said solids from said rotor in such a manner that said solids are discharged from the rotor in generally horizontal directions and gradually and progressively deflecting said discharged solids upwardly in a direction forming a substantial angle with respect to the horizontal.

LAURENCE PRICE SHARPLES.

CERTIFICATE OF CORRECTION.

Patent No. 2,095,206.  October 5, 1937.

LAURENCE PRICE SHARPLES.

It is hereby certified that error appears in the printed specification of the above numbered patent requiring correction as follows: Page 4, second column, after line 72, claim 12, insert the following as claim 13:

13. In a machine for separating liquid from solids, the combination comprising a centrifugal rotor adapted to effect separation of liquid from solids and discharge of liquid from the rotor, means for effecting discharge of solids from the rotor separately from the liquid in substantially horizontal directions, and a circular trough into which said solids are adapted to be discharged, said trough closely surrounding the discharging surface of the rotor and said trough being provided with deflecting surfaces arranged in the line of discharge of solids and adapted to effect deflection of said solids in a substantially vertical direction.;

and that the said Letters Patent should be read with this correction therein that the same may conform to the record of the case in the Patent Office.

Signed and sealed this 25th day of January, A. D. 1938.

(Seal)

Henry Van Arsdale,
Acting Commissioner of Patents.